United States Patent

Joy

[11] Patent Number: 4,473,754
[45] Date of Patent: Sep. 25, 1984

[54] WASTE HEAT POWER GENERATION SYSTEM

[75] Inventor: John R. Joy, Brighton, Mich.

[73] Assignee: Williams International Corporation, Walled Lake, Mich.

[21] Appl. No.: 401,822

[22] Filed: Jul. 26, 1982

[51] Int. Cl.³ .......................... H02K 7/10; H02P 9/04
[52] U.S. Cl. ...................................... 290/54; 290/43; 290/52; 60/684
[58] Field of Search ................... 60/600, 641.1, 641.2, 60/641.3, 656, 684; 290/52, 43, 54, 1 R, 40 C

[56] References Cited

U.S. PATENT DOCUMENTS

| | | | |
|---|---|---|---|
| 2,453,938 | 11/1948 | Schmidt | 60/684 |
| 2,641,905 | 6/1953 | Keller | 60/684 |
| 2,714,670 | 8/1955 | Linder et al. | 290/40 R |

Primary Examiner—J. V. Truhe
Assistant Examiner—Shelley Wade
Attorney, Agent, or Firm—Lyman R. Lyon

[57] ABSTRACT

The invention relates to a power generation system comprising a Brayton cycle turbine for directly driving a first air compressor. A motor/generator is adapted to drive said turbine in the power generating condition and be driven by said turbine in the start condition. A second air compressor is also directly driven by said turbine and is coupled to said turbine, motor/generator, and said first air compressor by a gear system. A heat exchanger between said second air compressor and said turbine provides heat energy to drive the system.

1 Claim, 1 Drawing Figure

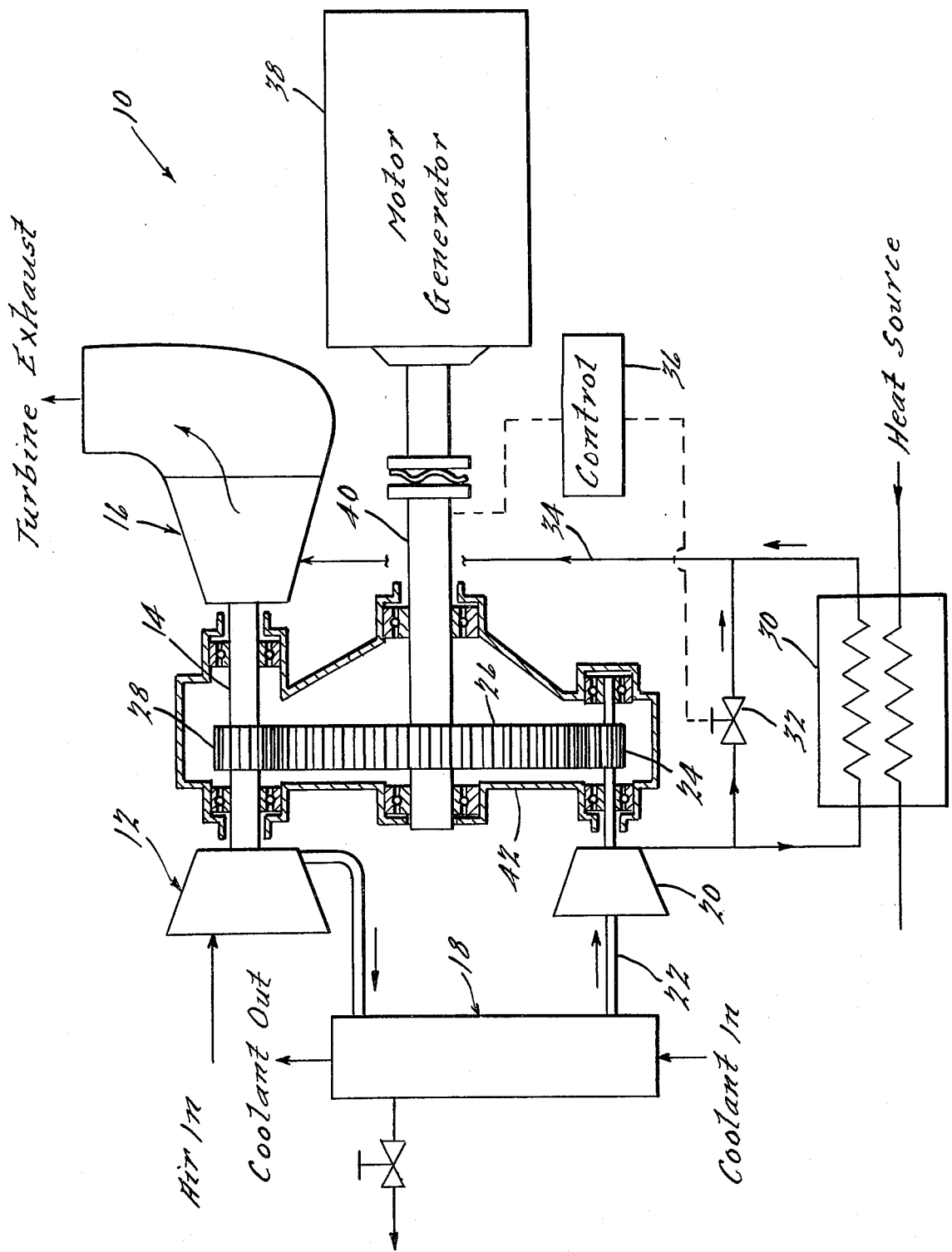

4,473,754

WASTE HEAT POWER GENERATION SYSTEM

BACKGROUND OF THE INVENTION

1. Field of the Invention

This invention relates to a system for the generation of power from waste heat and more specifically to a system that utilizes hot waste fluids for the generation of electric power and other purposes using a unique arrangement of components which operate in a Brayton Cycle.

2. Description of the Prior Art

Power generation systems which use a multiplicity of parallel shafts engaged with a common bull gear are known. Such systems are generally started by an outside electric power source which is used to drive multi-staged compressors. It is also known to use an expansion turbine and compressor jointly coupled to a generator to provide electric power.

SUMMARY OF THE INVENTION

The present invention provides for the recovery of waste heat by a Brayton Cycle system which uses a separate shaft for each compressor stage, so that each may operate at its most efficient speed. A turbine drives one of the shafts and a first stage air compressor. The turbine driven shaft also drives a bull gear which in turn drives a second stage air compressor. A motor/generator is connected to the bull gear shaft and functions as the prime mover of a starting system as well as the power generator.

An intercooler is provided between each compressor stage to increase the electric power produced from a given heat source. An improved arrangement is provided in which all bearings, gears, seals, and other lubricated elements are contained within a single pressurized gearbox. The gearbox is pressurized to prevent the intrusion of foreign material for outside sources. The aforesaid arrangement also provides accessibility and for easy removal and replacement of the compressor and turbine stages by mounting these elements on shafts which are over hung from the central gearbox.

BRIEF DESCRIPTION OF THE DRAWINGS

FIG. 1 is a diagrammatic view of a power generation system in accordance with the instant invention.

DETAILED DESCRIPTION OF THE PREFERRED EMBODIMENT OF THE INVENTION

As seen in FIG. 1 of the drawing, a power generation system 10 in accordance with the present invention comprises a low pressure air compressor 12 mounted at one end of a low-speed pinion shaft 14. The pinion shaft 14 is driven by an air cycle turbine 16. Air leaves the low-pressure compressor 12, and enters an intercooler 18, where it is cooled before entering a second-stage compressor 20. The second-stage compressor 20 is driven by a high-speed pinion shaft 22 which carries a pinion gear 24 that meshed with a bull gear 26. The bull gear 26 is also meshes with a low-speed pinion gear 28 on the low-speed pinion shaft 14. While only two stages of compression and a single intercooler are shown in the diagram, it is evident that the invention contemplates any desired number of compressor stages, and any number of high-speed shafts with intercooling between each compressor stage.

Part of the air leaving the high-pressure compressor 20 enters a heat exchanger 30 where it is heated by a waste heat source (not shown). The remaining air leaving the high-pressure air compressor 20 passes through a bypass valve 32. High pressure air from the heat exchanger 30 and bypass valve 32 is combined and delivered by a single conduit 34 to the turbine 16. The bypass valve 32 controls the temperature of the air entering the turbine 16 as controlled by a control 36 which obtains its command signal from speed or load sensors (not shown) according to system design and requirements.

When supplied with sufficient heat in the heat exchanger 30, the high-pressure air is expanded in the turbine 16 which produces sufficient power to drive the low and high pressure compressors 12 and 20, through the low and high speed shafts 14 and 22, respectively, as well as a motor/generator 38 through a shaft 40 coupled to the bull gear 26. The motor/generator 38 may be of the induction or synchronous type and is used to initiate circulation of air through the Brayton Cycle system 10 and to accelerate it to a speed at which the system 10 is self-sufficient. When sufficient heat is supplied to the system 10, the motor/generator 38 will generate electric power or produce mechanical power, as desired.

One of the features of the instant invention is that the compressors 12 and 20, turbine 16 and motor/generator 38 are over-hung on shafts 14, 22 and 40, respectively, that are journaled in a common gearbox 42 in such a way that all bearings, gears, seals and other elements requiring lubrication are contained within the gearbox 42. Another feature is that the separate shafts 14, 22 provided for operation of the compressors 12 and 20, respectively at different speeds so that each compressor may operate at its most efficient speed. Further, the intercooler 18 between the compressors 12 and 20 increases the generation of useful power from a given heat source. Yet another feature of the invention is the provision of the dual purpose electric motor/generator 38 which serves to accelerate the compressors 12 and 20 and turbine 16 of the system 10 to a self-sufficient speed when supplied with electric power from an outside source, and serves to produce electric power when the heat exchanger 30 is supplied with sufficient heat from an outside source.

While the preferred embodiment of the invention has been disclosed, it should be appreciated that the invention is susceptible of modification without departing from the scope of the following claims.

I claim:

1. A Brayton Cycle power generation system comprising:
   a first shaft,
   a turbine on said first shaft,
   a first air compressor on said first shaft so as to be directly driven by said turbine,
   a first gear on said first shaft intermediate said turbine and compressor,
   a motor generator shaft,
   a motor/generator on said motor generator shaft adapted to drive said turbine in one condition and be driven by said turbine in another condition,
   a bull gear on said motor generator shaft meshed with said first gear,
   a second shaft,
   a second air compressor on said second shaft having a second gear meshed with said bull gear so as to be driven by said turbine, and
   a common sealable gearbox enclosing each of said gears,
   said air compressors, motor generator and turbine being mounted externally of said gearbox whereby a pressure differential can be maintained between internal pressure in said gearbox and ambient pressure.

* * * * *